United States Patent Office 2,767,564
Patented Oct. 23, 1956

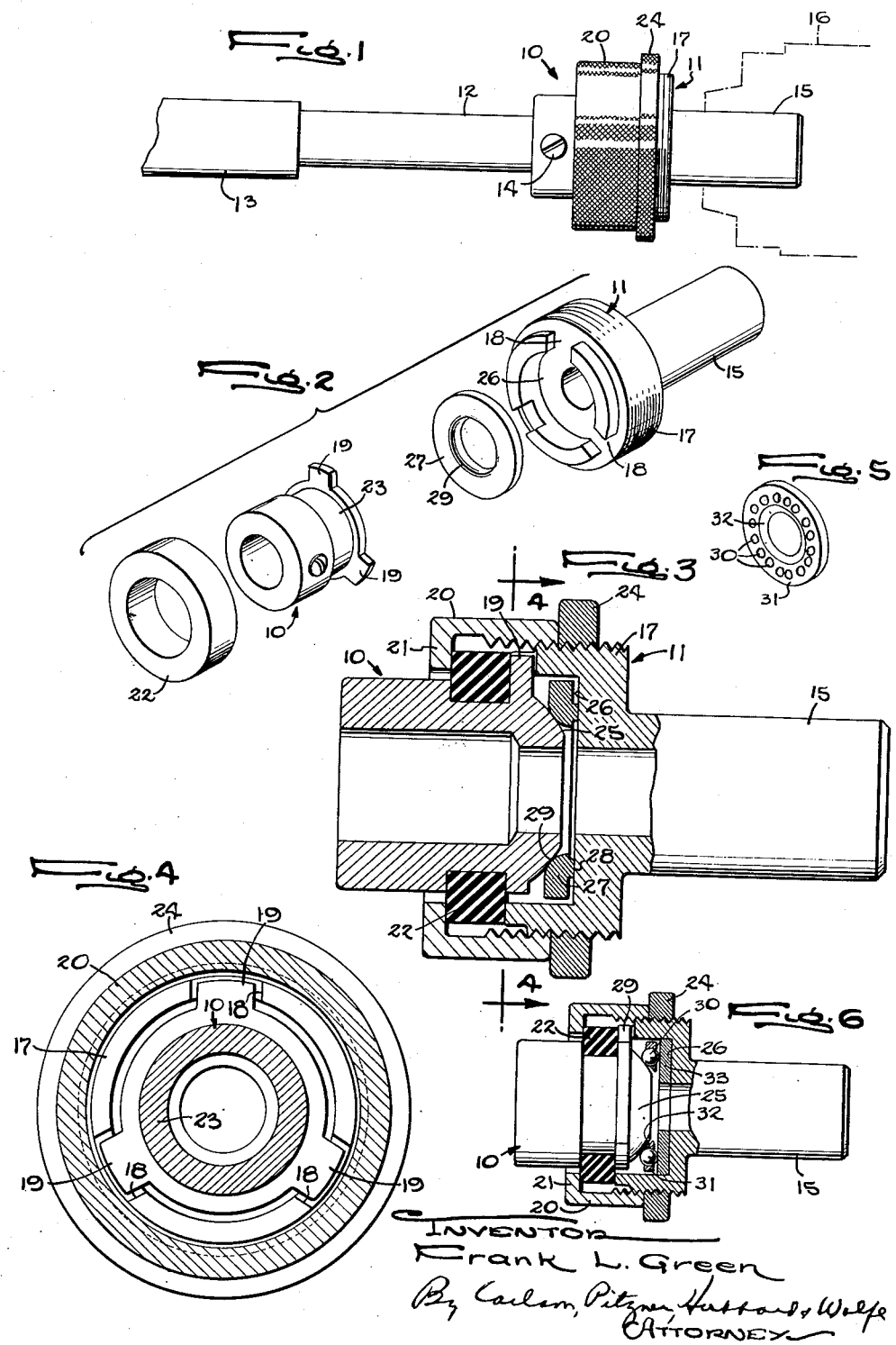

2,767,564
TOOL HOLDER
Frank L. Green, Rockton, Ill.
Application June 4, 1954, Serial No. 434,389
4 Claims. (Cl. 64—6)

This invention relates to holders for supporting cutting tools such as reamers, taps, etc. More particularly, the invention relates to holders of the type having two loosely telescoping members joined together by a torque transmitting and thrust sustaining connection which permits limited lateral floating and universal movement of one member in all directions relative to the other member to enable the tool to become alined accurately with the work surface to be operated on.

One object of the invention is to construct the thrust sustaining parts of a tool holder of the above character in a novel manner to facilitate floating of the members while distributing the thrust substantially uniformly around the axes of the members to avoid wear of the parts.

Another object is to distribute axial thrust uniformly in all relative positions of the members by a novel construction of opposed bearing surfaces on the members and a thrust sustaining bearing element between such surfaces.

A more detailed object is to distribute the thrust by interposing an annular bearing element between opposed flat and generally spherical surfaces on the respective members.

Other objects and advantages of the invention will become apparent from the following detailed description taken in connection with the accompanying drawings, in which Figure 1 is a plan view of a tool holder embodying the novel features of the present invention.

Fig. 2 is an exploded perspective view.

Fig. 3 is a diametrical sectional view.

Fig. 4 is a sectional view taken along the line 4—4 in Fig. 3.

Fig. 5 is a perspective view of a modified form of bearing element.

Fig. 6 is a fragmentary view similar to Fig. 3 of the holder with the modified bearing element.

In the drawings, the invention is shown for purposes of illustration embodied in a tool holder which comprises generally a chuck member 10, a body member 11 telescoping at one end with the chuck member and a torque transmitting and thrust sustaining connection between the members permitting limited transaxial floating in addition to tilting or universal movement of one member in all directions relative to the other member.

The chuck 10 is a sleeve centrally bored to receive the shank 12 of a reamer 13 or other tool which is held in the chuck in the usual way as by a set screw 14. The body member 11 comprises a hollow shank 15 adapted to fit into and to be secured to a chuck 16 on the drive spindle of a machine tool and an enlarged cup-shaped head 17 having a cylindrical portion open at its forward end and telescoping loosely with the inner end of the holder chuck 10.

Driving torque is transmitted between the body members 10 and 11 through an Oldham coupling comprising angularly spaced axially opening slots 18 formed in the end of the cup 17 and receiving correspondingly spaced lugs 19 projecting radially from the periphery of the sleeve adjacent but short of the inner end of the latter. As shown in Fig. 4, the lugs fit loosely in their slots and the outer diameter of the sleeve is slightly less than the inner diameter of the head so as to permit free radial and angular displacement of the members and their axes relative to each other. Such floating reduces the dangers of tool breakage and inaccuracies in sizing of the work hole due to axial misalinement or relative offsetting of the work hole and the driving spindle chuck 16.

Axial thrust exerted on the tool 13 as the latter enters a work hole is sustained by a bearing element 27 which is disposed within the cup 17 and abuts on opposite sides against opposed surfaces 25 and 26 respectively formed on the end of the sleeve 10 and the bottom of the cup 17. In accordance with the present invention, these surfaces and the bearing element are constructed in a novel manner to permit free relative floating of the members while providing at all times a rigid backing and distributing of the thrust substantially uniformly about the axes of the members in all of their relative positions. To these ends, the opposed surfaces 26 and 25 are made respectively flat and generally spherical in contour and the bearing element 27 is generally annular for abutment with each surface along a circle centered approximately on the axes of the two members.

In the present instance, the spherical surface 25 is formed on the inner end of the chuck sleeve 10 and projects axially and inwardly beyond the lugs 19, the center of the sphere on which the surface lies being located on the sleeve axis. The opposed flat surface 26 constitutes the annular inner side of the bottom wall of the cup-shaped head 17 and is concentric with the axis of the shank 15. This surface lies in a plane normal to the shank axis.

The preferred form of bearing element 27 shown in Figs. 1 to 3 is a metal ring disposed within and telescoping loosely with the head 17 and having a flat axially facing side 28 lying flat against and slidable long the flat surface 26 on the head to permit shifting of the bearing ring and the chuck sleeve 10 radially relative to the head. On its other side and around its inner periphery 29, the ring abuts the spherical surface 25. To facilitate sliding on the latter, the inner periphery 29 of the ring is beveled with a slightly convex contour. The relative diameters of the spherical surface 25 and the inner periphery 29 of the bearing ring are such that the ring engages the surface along a continuous circle in all relative positions of the chuck and body members 10 and 11. In the present instance, the diameter of the inner periphery 29 of the ring 27 is equal approximately to the radius of the sperical surface. The thickness of the bearing ring is sufficient to maintain the spherical surface 25 spaced from and out of contact with the opposed flat surface 26.

To hold the chuck and body members 10 and 11 and the bearing element 27 in assembled relation while permitting radial shifting of the chuck member 10 and the bearing element relative to the body member 11 and tilting of the axis of the chuck member to the axes of the bearing element and the body member, the chuck member is urged axially toward the flat wall 26 of the body member by yieldable means 22 which acts between the two members. In this instance, the yieldable means is a ring of resilient material such as relatively live rubber of rectangular cross section seated in an outwardly opening groove 23 formed around the periphery of the chuck sleeve adjacent but on the outer side of the lugs 19. The rubber ring projects radially beyond the sleeve and is compressed against the lugs and the end of the head 17 (see Fig. 3) by an inturned flange 21 on the outer end of a nut 20 which is threaded onto the exterior of the head 17. On its inner periphery, the flange 21 is larger in diameter than the chuck sleeve 10 to telescope loosely with the latter. The nut is turned onto the head 17 to compress the ring 22 far enough to apply a frictional pressure beween the chuck sleeve 10 and the bearing ring 27 and between the latter and the body wall 26 sufficient to maintain the relative positions of these parts upon withdrawal of the tool 13 out of engagement with a workpiece while permitting relative shifting of these parts when the tool engages the workpiece. A suitable lock nut 24 is also threaded on the exterior of the head and against the flanged nut 20 to retain the latter in selected axial positions.

With the parts assembled as described above and the flanged nut 20 screwed onto the head 17 to compress the rubber ring 22 against the lugs 19 and the end of the head 17 to apply pressure between the bearing ring 27 and the opposed spherical and flat surfaces 25 and 26, the chuck 10 is free to shift both radially and angularly relative to the body 11 as well as tilt to swing the axes of the members out of parallelism or alinement against the action of the rubber ring. During such radial shifting of the members, the flat side 28 of the bearing ring 27 slides radially along the flat surface 26 on the head. Tilting of the axes of the members is accompanied by rocking of the spherical end 25 in the periphery 29 while at all times contacting the periphery around its entire circumference, the periphery constituting a socket receiving the spherical end 25. Thus, in all conditions of angular or lateral misalinement, the bearing ring remains in full contact with the surface 26 which thus forms a solid backing around which the thrust is distributed uniformly and wearing of the rubbing surfaces is effectually minimized.

As shown in Figs. 5 and 6, the bearing element may also take the form of a plurality of balls 30 supported in an annular series about the axes of the members 10 and 11 by a race ring 31 which is constructed in a novel manner to enable the portions of the balls on one side to form the spherical socket for the surface 25 and on the other side to engage the flat backing around a complete annulus. To this end, the inner periphery of the race ring is beveled off as indicated at 32 to allow all of the balls to contact the spherical surface 25 at all times. The race ring 31 is generally flat and of a diameter slightly less than that of the inner periphery of the head to permit radial shifting of the ring and the balls with the chuck relative to the head. The balls are held in uniformly spaced holes around the race ring by upsetting the latter at spaced points around the periphery of each hole. If desired, a flat annular washer 33 may be interposed between the ball bearings and the flat head surface 26 as shown in Fig. 6 to reduce wear on the latter.

In the modified form of the holder shown in Figs. 5 and 6, the chuck and body members 10 and 11 may shift relative to each other substantially as in the preferred form to effect true axial alinement of the tool 13 in a work hole. During such shifting, the balls 30 engage the spherical surface 25 and the opposed flat side of the washer 33 each along an interrupted circle, or, stated another way, at angularly spaced points lying on a circle and spaced substantially uniformly around the axes of the members to distribute the axial forces and reduce wear on the thrust sustaining parts.

I claim as my invention:

1. A tool holder comprising a cup member, a tubular member having one end extending into and telescoping loosely with said cup member, means on said end of said tubular member defining an axially facing annular surface lying on a sphere centered on the axis of the member, means on the bottom of said cup defining a flat surface facing axially toward and spaced from said spherical surface, a positive torque transmitting connection between said members permitting limited lateral floating and universal movement of one member in all directions relative to the other member and comprising teeth formed on the respective members and presenting circumferentially facing surfaces engaging each other in a radial drive plane spaced axially along said tubular member from said spherical surface, an annular bearing ring having an outer diameter smaller than the inner diameter of said cup member and formed with a flat side abutting said flat surface and slidable radially along the latter within the cup member, the inner periphery of said ring on the other side thereof presenting a convex surface contacting said spherical surface along a circle in all relative positions of said members permitted by said connection, and means acting between said members and yieldably urging said surfaces axially toward each other and into engagement with opposite sides of said ring.

2. A tool holder comprising a cup member and a tubular member telescoping loosely together and having opposed axially facing surfaces, one of said surfaces having a generally spherical contour and the other surface being flat, a positive torque transmitting connection between said members permitting limited lateral floating and universal movement of one member in all directions relative to the other member and comprising teeth formed on the respective members and presenting circumferentially facing surfaces engaging each other in a radial drive plane disposed on the same side of said spherical surface as the center thereof, yieldable means acting between said members to urge said surfaces axially toward each other, and an annular thrust sustaining ring interposed between said surfaces and having a flat side axially abutting and slidable radially along said flat surface during shifting of said members radially relative to each other, the other side of said ring, during tilting of the axes of said members relative to each other as permitted by said torque transmitting connection, engaging said spherical surface in a radially disposed plane disposed closely adjacent said drive plane.

3. A tool holder comprising a cup member and a tubular member telescoping loosely together and having opposed annular axially facing surfaces, one of said members being adapted for connection with the shank of a rotary tool and the other member having an axially projecting shank, a positive torque transmitting connection between said members permitting limited lateral floating and universal movement of one member in all directions relative to the other member and comprising teeth formed on the respective elements and engaging each other circumferentially, one of said surfaces having a generally spherical convex contour and the other surface being generally flat, a thrust sustaining element interposed between said surfaces and presenting axially facing flat and convex surfaces respectively contacting said flat surface and said spherical surface of said member in all relative positions of said members, and yieldable means acting between said members and urging said surfaces axially toward each other and into abutment with said thrust sustaining element.

4. A tool holder comprising a cup having a flat bottom and a member having one end portion loosely telescoped into the cup, tooth means formed on the open end of the cup and around the periphery of said member and engaging each other circumferentially to provide a positive drive coupling permitting both angular and lateral displacement between said member and cup, a ring within said cup abutting on one side against said cup bottom and providing on the other side a spherical socket, a spherical surface formed on the end of said member within said cup and seated in said socket, a nut threaded onto the open end of said cup and having a flange providing an axially and inwardly facing surface, and yieldable means acting between said flange and said member to urge said spherical surface axially toward said cup bottom to clamp said ring between the two under different axial forces determined by adjustment of said nut along said cup.

References Cited in the file of this patent

UNITED STATES PATENTS

| 1,831,382 | Gairing | Nov. 10, 1931 |
| 2,392,039 | Gideon | Jan. 1, 1946 |
| 2,570,752 | Benjamin et al. | Oct. 9, 1951 |